US012375692B2

(12) United States Patent
Choi et al.

(10) Patent No.: US 12,375,692 B2
(45) Date of Patent: *Jul. 29, 2025

(54) SIGNALING OF REFERENCE PICTURE RESAMPLING WITH CONSTANT WINDOW SIZE IN VIDEO BITSTREAM

(71) Applicant: TENCENT AMERICA LLC, Palo Alto, CA (US)

(72) Inventors: Byeongdoo Choi, Palo Alto, CA (US); Stephan Wenger, Hillsborough, CA (US); Shan Liu, San Jose, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/514,598

(22) Filed: Nov. 20, 2023

(65) Prior Publication Data
US 2024/0089472 A1   Mar. 14, 2024

Related U.S. Application Data

(63) Continuation of application No. 17/458,900, filed on Aug. 27, 2021, now Pat. No. 11,871,013, which is a
(Continued)

(51) Int. Cl.
*H04N 19/196*     (2014.01)
*H04N 19/105*     (2014.01)
(Continued)

(52) U.S. Cl.
CPC ......... *H04N 19/196* (2014.11); *H04N 19/105* (2014.11); *H04N 19/132* (2014.11); *H04N 19/147* (2014.11); *H04N 19/172* (2014.11)

(58) Field of Classification Search
CPC .. H04N 19/196; H04N 19/105; H04N 19/132; H04N 19/147; H04N 19/172
(Continued)

(56) References Cited

U.S. PATENT DOCUMENTS

2014/0269912 A1   9/2014   Sullivan
2015/0146785 A1*  5/2015   Bates ............... H04N 19/91
                                                    375/240.16
(Continued)

OTHER PUBLICATIONS

Communication dated Nov. 13, 2023 from Indonesian Patent Office in Application No. P00202108644.
(Continued)

*Primary Examiner* — Allen C Wong
(74) *Attorney, Agent, or Firm* — Sughrue Mion, PLLC

(57) ABSTRACT

A method of decoding an encoded video bitstream using at least one processor, including obtaining a first flag indicating whether a constant picture size is used in a coded video sequence including a current picture; based on the first flag indicating that the constant picture size is used, decoding the current picture without performing reference picture resampling; based on the first flag indicating that the constant picture size is not used, obtaining a second flag indicating whether a conformance window size is signaled; based on the second flag indicating that the conformance window size is signaled: obtaining the conformance window size, determining a resampling ratio between the current picture and a reference picture based on the conformance window size, and performing the reference picture resampling on the current picture using the resampling ratio.

20 Claims, 10 Drawing Sheets

Related U.S. Application Data continuation of application No. 17/009,979, filed on Sep. 2, 2020, now Pat. No. 11,140,402.

(60) Provisional application No. 62/903,601, filed on Sep. 20, 2019.

(51) Int. Cl.
  *H04N 19/132* (2014.01)
  *H04N 19/147* (2014.01)
  *H04N 19/172* (2014.01)

(58) Field of Classification Search
  USPC .................................................... 375/240.02
  See application file for complete search history.

(56) References Cited

U.S. PATENT DOCUMENTS

| | | | |
|---|---|---|---|
| 2015/0304666 A1 | 10/2015 | Seregin et al. | |
| 2015/0326865 A1 | 11/2015 | Yin et al. | |
| 2021/0051341 A1* | 2/2021 | Seregin | H04N 19/167 |

OTHER PUBLICATIONS

Russian Office Action dated Sep. 4, 2023 in Russian Application No. 2023109621/07.

Chen et al., "AHG8: Support for reference picture resampling—handling of picture size signalling, conformance windows, and DPB management", Joint Video Experts Team (JVET) of ITU-T SG 16 WP 3 and ISO/IEC JTC 1/SC 29/WG 11, JVET-O0133-v1, Jul. 2019, pp. 1-3 (3 pages total).

Chang et al., "AHG8: Support for reference picture resampling—handling of resampling, TMVP, DMVR, and BDOF", Joint Video Experts Team (JVET) of ITU-T SG 16 WP 3 and ISO/IEC JTC 1/SC 29/WG 11, JVET-O0134-v1, Jul. 2019, pp. 1-4 (4 pages total).

Extended European Search Report issued Aug. 8, 2023 in Application No. 20865034.1.

J. Samuelsson, et al., "AHG 8: Adaptive Resolution Change (ARC) High-Level Syntax (HLS)", Joint Video Experts Team (JVET) of ITU-T SG 16 WP 3 and ISO/IEC JTC 1/SC 29/WG 11, JVET-O0204, Jul. 3-12, 2019 (6 pages).

Benjamin Bross, et al., "Versatile Video Coding (Draft 5)" Joint Video Experts Team (JVET) of ITU-T SG 16 WP 3 and ISO/IEC JTC 1/SC 29/WG 11, JVET-N1001-v10, Mar. 19-27, 2019 (406 pages).

Byeongdoo Choi, et al., "AHG8/AHG12: Efficient signaling of picture size and partitioning information", Joint Video Experts Team (JVET) of ITU-T SG 16 WP 3 and ISO/IEC JTC 1/SC 29/WG 11, JVET-P0223-v2, Oct. 1-11, 2019 (3 pages).

International Search Report dated Feb. 3, 2021 from the International Searching Authority in International Application No. PCT/US2020/050077.

Written Opinion dated Feb. 3, 2021 from the International Searching Authority in International Application No. PCT/US2020/050077.

\* cited by examiner

| tile_group_header( ) { | Descriptor |
|---|---|
| ... | |
| if(adaptive_pic_resolution_change_flag) { | |
| dec_pic_size_idx | u(1) |
| } | |
| ... | |
| } | |

FIG. 6A

601 → tile_group_header( ) {
603 → if(adaptive_pic_resolution_change_flag) {
602 → dec_pic_size_idx

| seq_parameter_set_rbsp( ) { | Descriptor |
|---|---|
| ... | |
| adaptive_pic_resolution_change_flag | u(1) |
| if(adaptive_pic_resolution_change_flag) { | |
| output_pic_width_in_luma_samples | ue(v) |
| output_pic_height_in_luma_samples | ue(v) |
| reference_pic_size_present_flag | u(1) |
| if(reference_pic_size_present_flag) { | |
| reference_pic_width_in_luma_samples | ue(v) |
| reference_pic_height_in_luma_samples | ue(v) |
| } | |
| num_dec_pic_size_in_luma_samples_minus1 | ue(v) |
| for( i = 0; i <= num_dec_pic_size_in_luma_samples_minus1; i++ ) { | |
| dec_pic_width_in_luma_samples[ i ] | ue(v) |
| dec_pic_height_in_luma_samples[ i ] | ue(v) |
| } | |
| ... | |
| } | |

FIG. 6B

610 → seq_parameter_set_rbsp( ) {
611 → adaptive_pic_resolution_change_flag
612 → if(adaptive_pic_resolution_change_flag) {
613 → output_pic_width_in_luma_samples
614 → reference_pic_size_present_flag
615 → reference_pic_width_in_luma_samples
616 → num_dec_pic_size_in_luma_samples_minus1
617 → dec_pic_height_in_luma_samples[ i ]

FIG. 7

| | Descriptor |
|---|---|
| seq_parameter_set_rbsp( ) { | |
| ... | |
| pic_width_max_in_luma_samples | ue(v) |
| pic_height_max_in_luma_samples | ue(v) |
| constant_pic_size_flag | u(1) |
| if( constant_pic_size_flag ) { | |
| sps_conformance_window_flag | u(1) |
| if( sps_conformance_window_flag ) { | |
| sps_conf_win_left_offset | ue(v) |
| sps_conf_win_right_offset | ue(v) |
| sps_conf_win_top_offset | ue(v) |
| sps_conf_win_bottom_offset | ue(v) |
| ... | |
| ... | |

701 — seq_parameter_set_rbsp( )
702 — pic_width_max_in_luma_samples
703 — pic_height_max_in_luma_samples
704 — constant_pic_size_flag
705 — sps_conformance_window_flag
706 — sps_conf_win_left_offset
707 — sps_conf_win_right_offset
708 — sps_conf_win_top_offset
709 — sps_conf_win_bottom_offset

FIG. 8

| | Descriptor |
|---|---|
| pic_parameter_set_rbsp() { | |
|   ... | |
|   if( !constant_pic_size_flag ){ | |
|     pic_width_in_luma_samples | ue(v) |
|     pic_height_in_luma_samples | ue(v) |
|     conformance_window_flag | u(1) |
|     if( conformance_window_flag ){ | |
|       conf_win_left_offset | ue(v) |
|       conf_win_right_offset | ue(v) |
|       conf_win_top_offset | ue(v) |
|       conf_win_bottom_offset | ue(v) |
|     } | |
|   } | |
| } | |

801 — pic_parameter_set_rbsp()
802 — pic_width_in_luma_samples
803 — pic_height_in_luma_samples
804 — conformance_window_flag
805 — conf_win_left_offset
806 — conf_win_right_offset
807 — conf_win_top_offset
808 — conf_win_bottom_offset

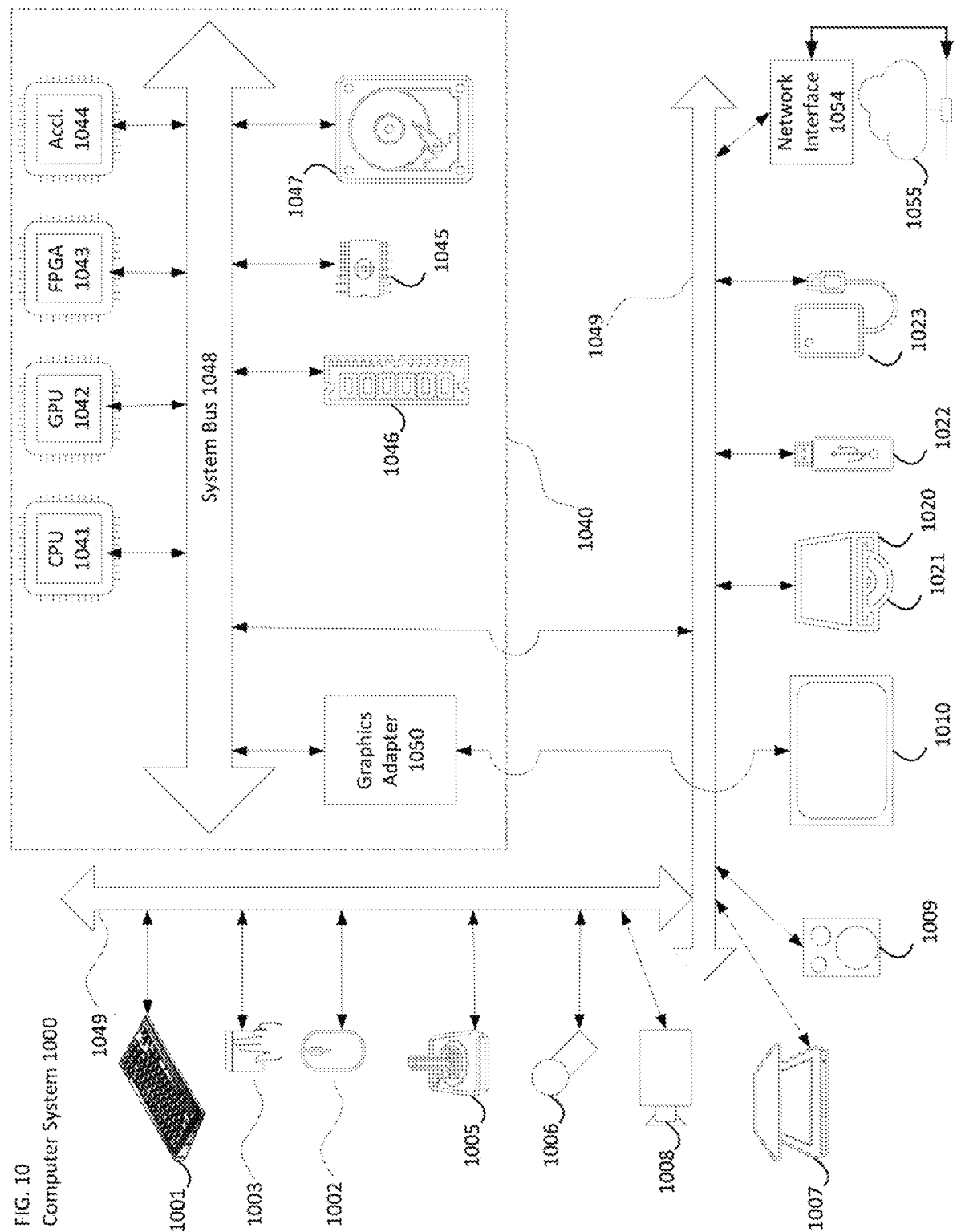

SIGNALING OF REFERENCE PICTURE RESAMPLING WITH CONSTANT WINDOW SIZE IN VIDEO BITSTREAM

CROSS-REFERENCE TO RELATED APPLICATION

This application is a Continuation Application of U.S. application Ser. No. 17/458,900, filed on Aug. 27, 2021, which is a continuation of U.S. application Ser. No. 17/009,979, filed on Sep. 2, 2020, now U.S. Pat. No. 11,140,402 issued Oct. 5, 2021, in the United States Patent & Trademark Office, which claims priority under 35 U.S.C. § 119 to U.S. Provisional Application No. 62/903,601, filed on Sep. 20, 2019, in the United States Patent & Trademark Office, the disclosures of which are incorporated herein by reference in their entireties.

FIELD

The disclosed subject matter relates to video coding and decoding, and more specifically, to the signaling of a size of a picture, or parts of a picture, that may change from picture to picture or picture part to picture part.

BACKGROUND

Video coding and decoding using inter-picture prediction with motion compensation has been known. Uncompressed digital video can consist of a series of pictures, each picture having a spatial dimension of, for example, 1920×1080 luminance samples and associated chrominance samples. The series of pictures can have a fixed or variable picture rate (informally also known as frame rate), of, for example 60 pictures per second or 60 Hz. Uncompressed video has significant bitrate requirements. For example, 1080p60 4:2:0 video at 8 bit per sample (1920×1080 luminance sample resolution at 60 Hz frame rate) requires close to 1.5 Gbit/s bandwidth. An hour of such video requires more than 600 GByte of storage space.

One purpose of video coding and decoding can be the reduction of redundancy in the input video signal, through compression. Compression can help reducing aforementioned bandwidth or storage space requirements, in some cases by two orders of magnitude or more. Both lossless and lossy compression, as well as a combination thereof can be employed. Lossless compression refers to techniques where an exact copy of the original signal can be reconstructed from the compressed original signal. When using lossy compression, the reconstructed signal may not be identical to the original signal, but the distortion between original and reconstructed signal is small enough to make the reconstructed signal useful for the intended application. In the case of video, lossy compression is widely employed. The amount of distortion tolerated depends on the application; for example, users of certain consumer streaming applications may tolerate higher distortion than users of television contribution applications. The compression ratio achievable can reflect that: higher allowable/tolerable distortion can yield higher compression ratios.

A video encoder and decoder can utilize techniques from several broad categories, including, for example, motion compensation, transform, quantization, and entropy coding, some of which will be introduced below.

Historically, video encoders and decoders tended to operate on a given picture size that was, in most cases, defined and stayed constant for a coded video sequence (CVS), Group of Pictures (GOP), or a similar multi-picture timeframe. For example, in MPEG-2, system designs are known to change the horizontal resolution (and, thereby, the picture size) dependent on factors such as activity of the scene, but only at I pictures, hence typically for a GOP. The resampling of reference pictures for use of different resolutions within a CVS is known, for example, from ITU-T Rec. H.263 Annex P. However, here the picture size does not change, only the reference pictures are being resampled, resulting potentially in only parts of the picture canvas being used (in case of downsampling), or only parts of the scene being captured (in case of upsampling). Further, H.263 Annex Q allows the resampling of an individual macroblock by a factor of two (in each dimension), upward or downward. Again, the picture size remains the same. The size of a macroblock is fixed in H.263, and therefore does not need to be signaled.

Changes of picture size in predicted pictures became more mainstream in modern video coding. For example, VP9 allows reference picture resampling and change of resolution for a whole picture. Similarly, certain proposals made towards VVC (including, for example, Hendry, et. al, "On adaptive resolution change (ARC) for VVC", Joint Video Team document WET-M0135-v1, Jan. 9-19, 2019, incorporated herein in its entirety) allow for resampling of whole reference pictures to different—higher or lower—resolutions. In that document, different candidate resolutions are suggested to be coded in the sequence parameter set and referred to by per-picture syntax elements in the picture parameter set.

SUMMARY

In an embodiment, there is provided a method of decoding an encoded video bitstream using at least one processor, the method including obtaining a first flag indicating whether a constant picture size is used in a coded video sequence including a current picture; based on the first flag indicating that the constant picture size is used, decoding the current picture without performing reference picture resampling; based on the first flag indicating that the constant picture size is not used, obtaining a second flag indicating whether a conformance window size is signaled; based on the second flag indicating that the conformance window size is signaled: obtaining the conformance window size, determining a resampling ratio between the current picture and a reference picture based on the conformance window size, and performing the reference picture resampling on the current picture using the resampling ratio.

In an embodiment, there is provided a device for decoding an encoded video bitstream, the device including at least one memory configured to store program code; and at least one processor configured to read the program code and operate as instructed by the program code, the program code including: first obtaining code configured to cause the at least one processor to obtain a first flag indicating whether a constant picture size is used in a coded video sequence including a current picture; decoding code configured to cause the at least one processor to, based on the first flag indicating that the constant picture size is used, decode the current picture without performing reference picture resampling; second obtaining code configured to cause the at least one processor to, based on the first flag indicating that the constant picture size is not used, obtain a second flag indicating whether a conformance window size is signaled; and performing code configured to cause the at least one processor to, based on the second flag indicating that the conformance window size is signaled, obtain the conformance window size, determine a resampling ratio between the current picture and a reference picture based on the conformance window size, and perform the reference picture resampling on the current picture using the resampling ratio.

In an embodiment, there is provided a non-transitory computer-readable medium storing instructions, the instructions including: one or more instructions that, when executed by one or more processors of a device for decoding an encoded video bitstream, cause the one or more processors to: obtain a first flag indicating whether a constant picture size is used in a coded video sequence including a current picture; based on the first flag indicating that the constant picture size is used, decode the current picture without performing reference picture resampling; based on the first flag indicating that the constant picture size is not used, obtain a second flag indicating whether a conformance window size is signaled; based on the second flag indicating that the conformance window size is signaled: obtain the conformance window size, determine a resampling ratio between the current picture and a reference picture based on the conformance window size, and perform the reference picture resampling on the current picture using the resampling ratio.

BRIEF DESCRIPTION OF THE DRAWINGS

Further features, the nature, and various advantages of the disclosed subject matter will be more apparent from the following detailed description and the accompanying drawings in which:

FIGS. 6A-6B are schematic illustration of examples of syntax tables in accordance with an embodiment.

FIG. 7 is a schematic illustration of signaling picture size and conformance window in SPS in accordance with an embodiment.

FIG. 8 is a schematic illustration of signaling picture size and conformance window in PPS in accordance with embodiments.

FIG. 10 is a schematic illustration of a computer system in accordance with an embodiment.

DETAILED DESCRIPTION

Figure 1:
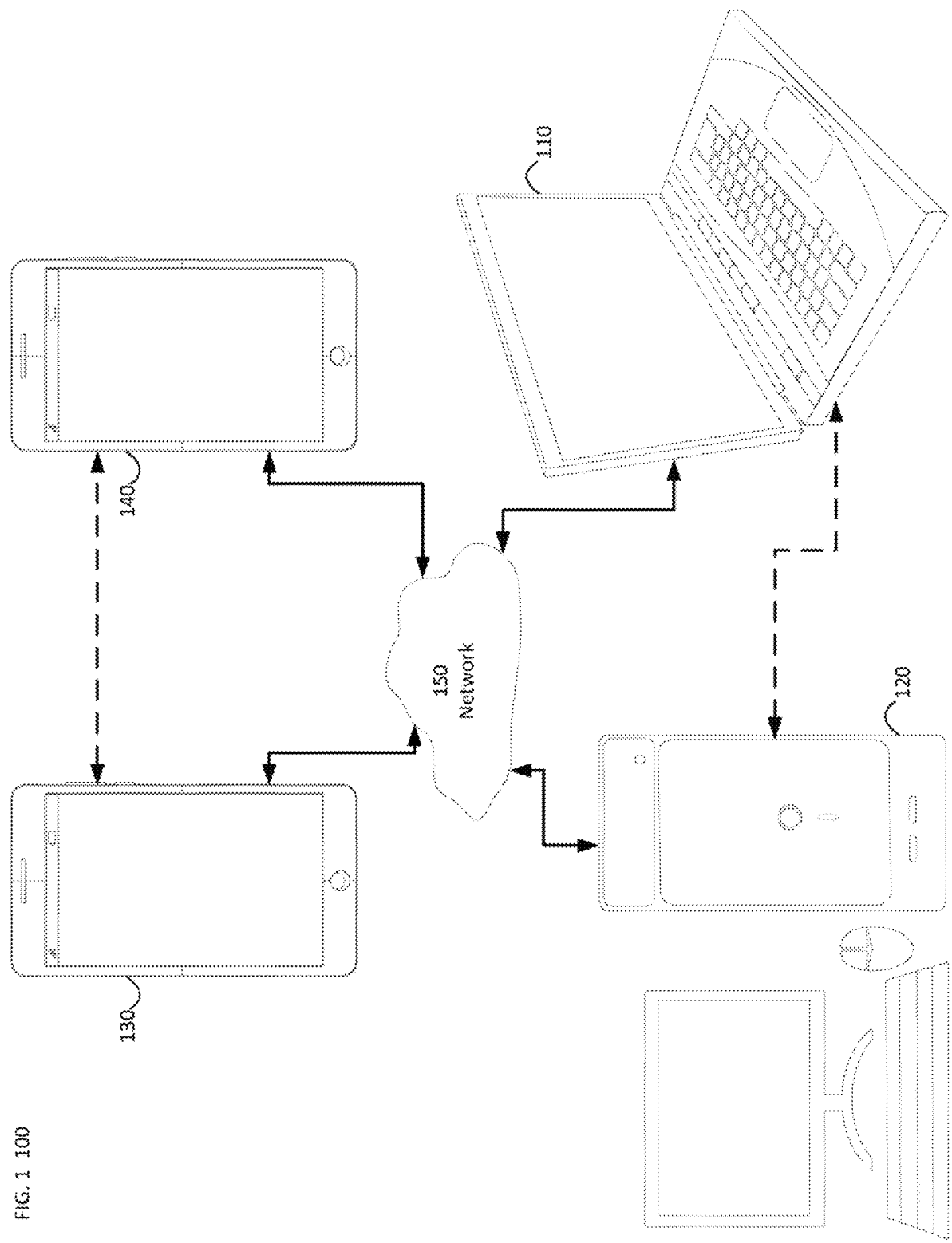
FIG. 1 is a schematic illustration of a simplified block diagram of a communication system in accordance with an embodiment.

FIG. 1 illustrates a simplified block diagram of a communication system (100) according to an embodiment of the present disclosure. The system (100) may include at least two terminals (110-120) interconnected via a network (150). For unidirectional transmission of data, a first terminal (110) may code video data at a local location for transmission to the other terminal (120) via the network (150). The second terminal (120) may receive the coded video data of the other terminal from the network (150), decode the coded data and display the recovered video data. Unidirectional data transmission may be common in media serving applications and the like.

FIG. 1 illustrates a second pair of terminals (130, 140) provided to support bidirectional transmission of coded video that may occur, for example, during videoconferencing. For bidirectional transmission of data, each terminal (130, 140) may code video data captured at a local location for transmission to the other terminal via the network (150). Each terminal (130, 140) also may receive the coded video data transmitted by the other terminal, may decode the coded data and may display the recovered video data at a local display device.

In FIG. 1, the terminals (110-140) may be illustrated as servers, personal computers and smart phones but the principles of the present disclosure may be not so limited. Embodiments of the present disclosure find application with laptop computers, tablet computers, media players and/or dedicated video conferencing equipment. The network (150) represents any number of networks that convey coded video data among the terminals (110-140), including for example wireline and/or wireless communication networks. The communication network (150) may exchange data in circuit-switched and/or packet-switched channels. Representative networks include telecommunications networks, local area networks, wide area networks and/or the Internet. For the purposes of the present discussion, the architecture and topology of the network (150) may be immaterial to the operation of the present disclosure unless explained herein below.

Figure 2:
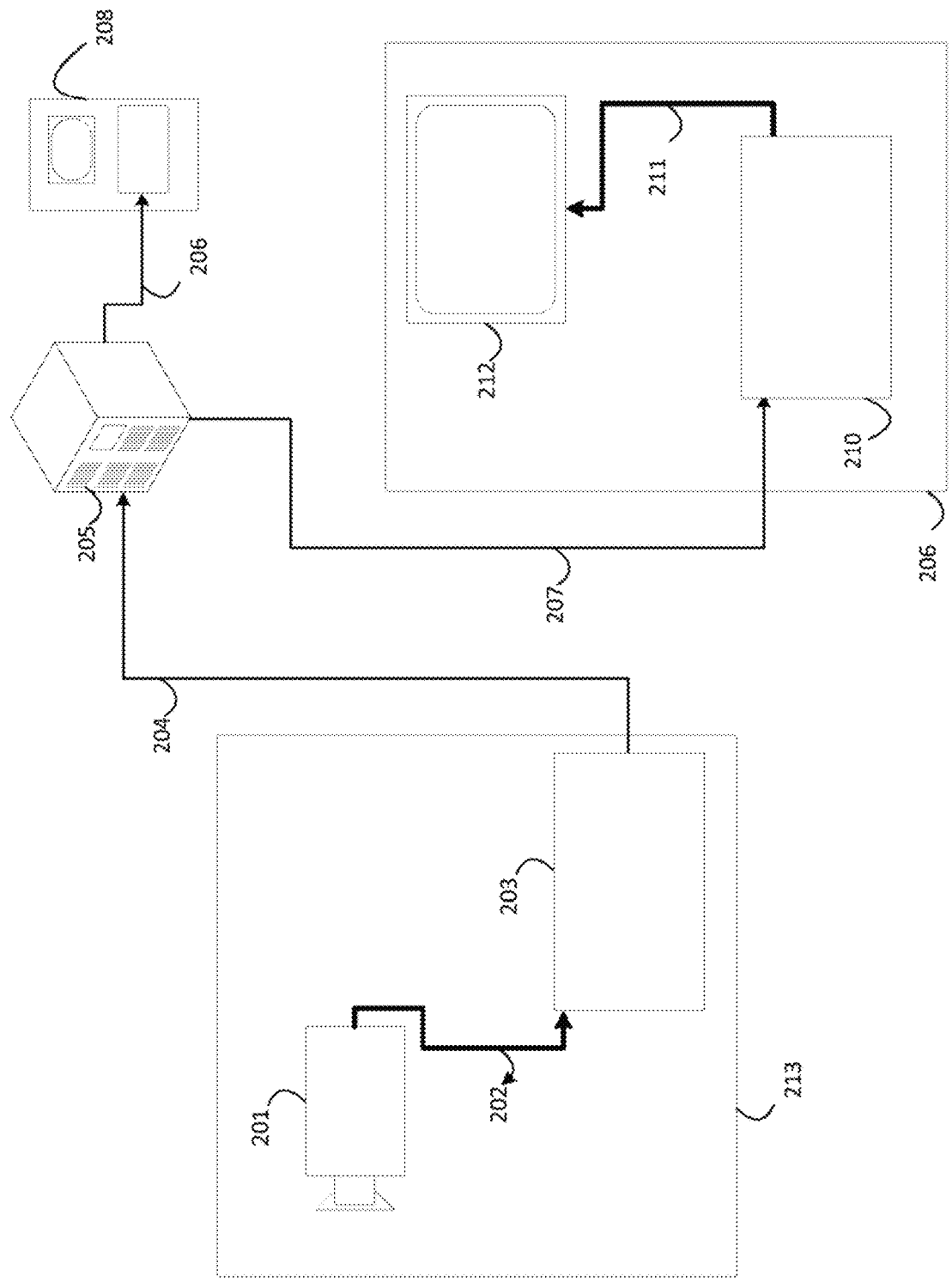
FIG. 2 is a schematic illustration of a simplified block diagram of a communication system in accordance with an embodiment.

FIG. 2 illustrates, as an example for an application for the disclosed subject matter, the placement of a video encoder and decoder in a streaming environment. The disclosed subject matter can be equally applicable to other video enabled applications, including, for example, video conferencing, digital TV, storing of compressed video on digital media including CD, DVD, memory stick and the like, and so on.

A streaming system may include a capture subsystem (213), that can include a video source (201), for example a digital camera, creating a for example uncompressed video sample stream (202). That sample stream (202), depicted as a bold line to emphasize a high data volume when compared to encoded video bitstreams, can be processed by an encoder (203) coupled to the camera (201). The encoder (203) can include hardware, software, or a combination thereof to enable or implement aspects of the disclosed subject matter as described in more detail below. The encoded video bitstream (204), depicted as a thin line to emphasize the lower data volume when compared to the sample stream, can be stored on a streaming server (205) for future use. One or more streaming clients (206, 208) can access the streaming server (205) to retrieve copies (207, 209) of the encoded video bitstream (204). A client (206) can include a video decoder (210) which decodes the incoming copy of the encoded video bitstream (207) and creates an outgoing video sample stream (211) that can be rendered on a display (212) or other rendering device (not depicted). In some streaming systems, the video bitstreams (204, 207, 209) can be encoded according to certain video coding/compression standards. Examples of those standards include ITU-T Recommendation H.265. Under development is a video coding standard informally known as Versatile Video Coding or VVC. The disclosed subject matter may be used in the context of VVC.

Figure 3:
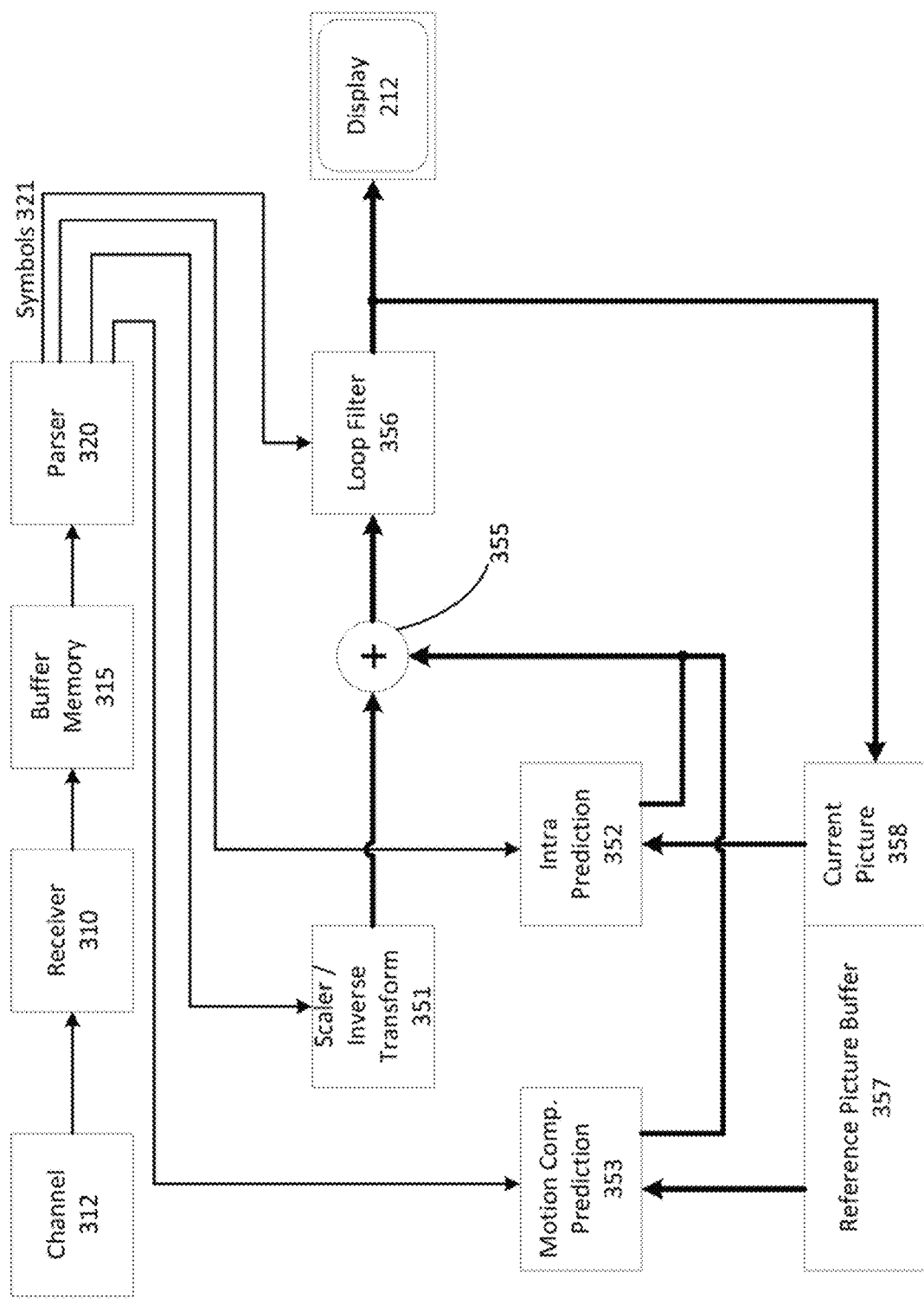
FIG. 3 is a schematic illustration of a simplified block diagram of a decoder in accordance with an embodiment.

FIG. 3 may be a functional block diagram of a video decoder (210) according to an embodiment of the present disclosure.

A receiver (310) may receive one or more codec video sequences to be decoded by the decoder (210); in the same or another embodiment, one coded video sequence at a time, where the decoding of each coded video sequence is independent from other coded video sequences. The coded video sequence may be received from a channel (312), which may be a hardware/software link to a storage device which stores the encoded video data. The receiver (310) may receive the encoded video data with other data, for example, coded audio data and/or ancillary data streams, that may be forwarded to their respective using entities (not depicted). The receiver (310) may separate the coded video sequence from the other data. To combat network jitter, a buffer memory (315) may be coupled in between receiver (310) and entropy decoder/parser (320) ("parser" henceforth). When receiver (310) is receiving data from a store/forward device of sufficient bandwidth and controllability, or from an isosychronous network, the buffer (315) may not be needed, or can be small. For use on best effort packet networks such as the Internet, the buffer (315) may be required, can be comparatively large and can advantageously of adaptive size.

The video decoder (210) may include a parser (320) to reconstruct symbols (321) from the entropy coded video sequence. Categories of those symbols include information used to manage operation of the decoder (210), and potentially information to control a rendering device such as a display (212) that is not an integral part of the decoder but can be coupled to it, as was shown in FIG. 3. The control information for the rendering device(s) may be in the form of Supplementary Enhancement Information (SEI messages) or Video Usability Information (VUI) parameter set fragments (not depicted). The parser (320) may parse/entropy-decode the coded video sequence received. The coding of the coded video sequence can be in accordance with a video coding technology or standard, and can follow principles well known to a person skilled in the art, including variable length coding, Huffman coding, arithmetic coding with or without context sensitivity, and so forth. The parser (320) may extract from the coded video sequence, a set of subgroup parameters for at least one of the subgroups of pixels in the video decoder, based upon at least one parameter corresponding to the group. Subgroups can include Groups of Pictures (GOPs), pictures, sub-pictures, tiles, slices, bricks, macroblocks, Coding Tree Units (CTUs) Coding Units (CUs), blocks, Transform Units (TUs), Prediction Units (PUs) and so forth. A tile may indicate a rectangular region of CU/CTUs within a particular tile column and row in a picture. A brick may indicate a rectangular region of CU/CTU rows within a particular tile. A slice may indicate one or more bricks of a picture, which are contained in an NAL unit. A sub-picture may indicate an rectangular region of one or more slices in a picture. The entropy decoder/parser may also extract from the coded video sequence information such as transform coefficients, quantizer parameter values, motion vectors, and so forth.

The parser (320) may perform entropy decoding/parsing operation on the video sequence received from the buffer (315), so to create symbols (321).

Reconstruction of the symbols (321) can involve multiple different units depending on the type of the coded video picture or parts thereof (such as: inter and intra picture, inter and intra block), and other factors. Which units are involved, and how, can be controlled by the subgroup control information that was parsed from the coded video sequence by the parser (320). The flow of such subgroup control information between the parser (320) and the multiple units below is not depicted for clarity.

Beyond the functional blocks already mentioned, decoder 210 can be conceptually subdivided into a number of functional units as described below. In a practical implementation operating under commercial constraints, many of these units interact closely with each other and can, at least partly, be integrated into each other. However, for the purpose of describing the disclosed subject matter, the conceptual subdivision into the functional units below is appropriate.

A first unit is the scaler/inverse transform unit (351). The scaler/inverse transform unit (351) receives quantized transform coefficient as well as control information, including which transform to use, block size, quantization factor, quantization scaling matrices, etc. as symbol(s) (321) from the parser (320). It can output blocks comprising sample values, that can be input into aggregator (355).

In some cases, the output samples of the scaler/inverse transform (351) can pertain to an intra coded block; that is: a block that is not using predictive information from previously reconstructed pictures, but can use predictive information from previously reconstructed parts of the current picture. Such predictive information can be provided by an intra picture prediction unit (352). In some cases, the intra picture prediction unit (352) generates a block of the same size and shape of the block under reconstruction, using surrounding already reconstructed information fetched from the current (partly reconstructed) picture (358). The aggregator (355), in some cases, adds, on a per sample basis, the prediction information the intra prediction unit (352) has generated to the output sample information as provided by the scaler/inverse transform unit (351).

In other cases, the output samples of the scaler/inverse transform unit (351) can pertain to an inter coded, and potentially motion compensated block. In such a case, a Motion Compensation Prediction unit (353) can access reference picture memory (357) to fetch samples used for prediction. After motion compensating the fetched samples in accordance with the symbols (321) pertaining to the block, these samples can be added by the aggregator (355) to the output of the scaler/inverse transform unit (in this case called the residual samples or residual signal) so to generate output sample information. The addresses within the reference picture memory form where the motion compensation unit fetches prediction samples can be controlled by motion vectors, available to the motion compensation unit in the form of symbols (321) that can have, for example X, Y, and reference picture components. Motion compensation also can include interpolation of sample values as fetched from the reference picture memory when sub-sample exact motion vectors are in use, motion vector prediction mechanisms, and so forth.

The output samples of the aggregator (355) can be subject to various loop filtering techniques in the loop filter unit (356). Video compression technologies can include in-loop filter technologies that are controlled by parameters included in the coded video bitstream and made available to the loop filter unit (356) as symbols (321) from the parser (320), but can also be responsive to meta-information obtained during the decoding of previous (in decoding order) parts of the coded picture or coded video sequence, as well as responsive to previously reconstructed and loop-filtered sample values.

The output of the loop filter unit (356) can be a sample stream that can be output to the render device (212) as well as stored in the reference picture memory for use in future inter-picture prediction.

Certain coded pictures, once fully reconstructed, can be used as reference pictures for future prediction. Once a coded picture is fully reconstructed and the coded picture has been identified as a reference picture (by, for example, parser (320)), the current reference picture (358) can become part of the reference picture buffer (357), and a fresh current picture memory can be reallocated before commencing the reconstruction of the following coded picture.

The video decoder 210 may perform decoding operations according to a predetermined video compression technology that may be documented in a standard, such as ITU-T Rec. H.265. The coded video sequence may conform to a syntax specified by the video compression technology or standard being used, in the sense that it adheres to the syntax of the video compression technology or standard, as specified in the video compression technology document or standard and specifically in the profiles document therein. Also necessary for compliance can be that the complexity of the coded video sequence is within bounds as defined by the level of the video compression technology or standard. In some cases, levels restrict the maximum picture size, maximum frame rate, maximum reconstruction sample rate (measured in, for example megasamples per second), maximum reference picture size, and so on. Limits set by levels can, in some cases, be further restricted through Hypothetical Reference Decoder (HRD) specifications and metadata for HRD buffer management signaled in the coded video sequence.

In an embodiment, the receiver (310) may receive additional (redundant) data with the encoded video. The additional data may be included as part of the coded video sequence(s). The additional data may be used by the video decoder (210) to properly decode the data and/or to more accurately reconstruct the original video data. Additional data can be in the form of, for example, temporal, spatial, or SNR enhancement layers, redundant slices, redundant pictures, forward error correction codes, and so on.

Figure 4:
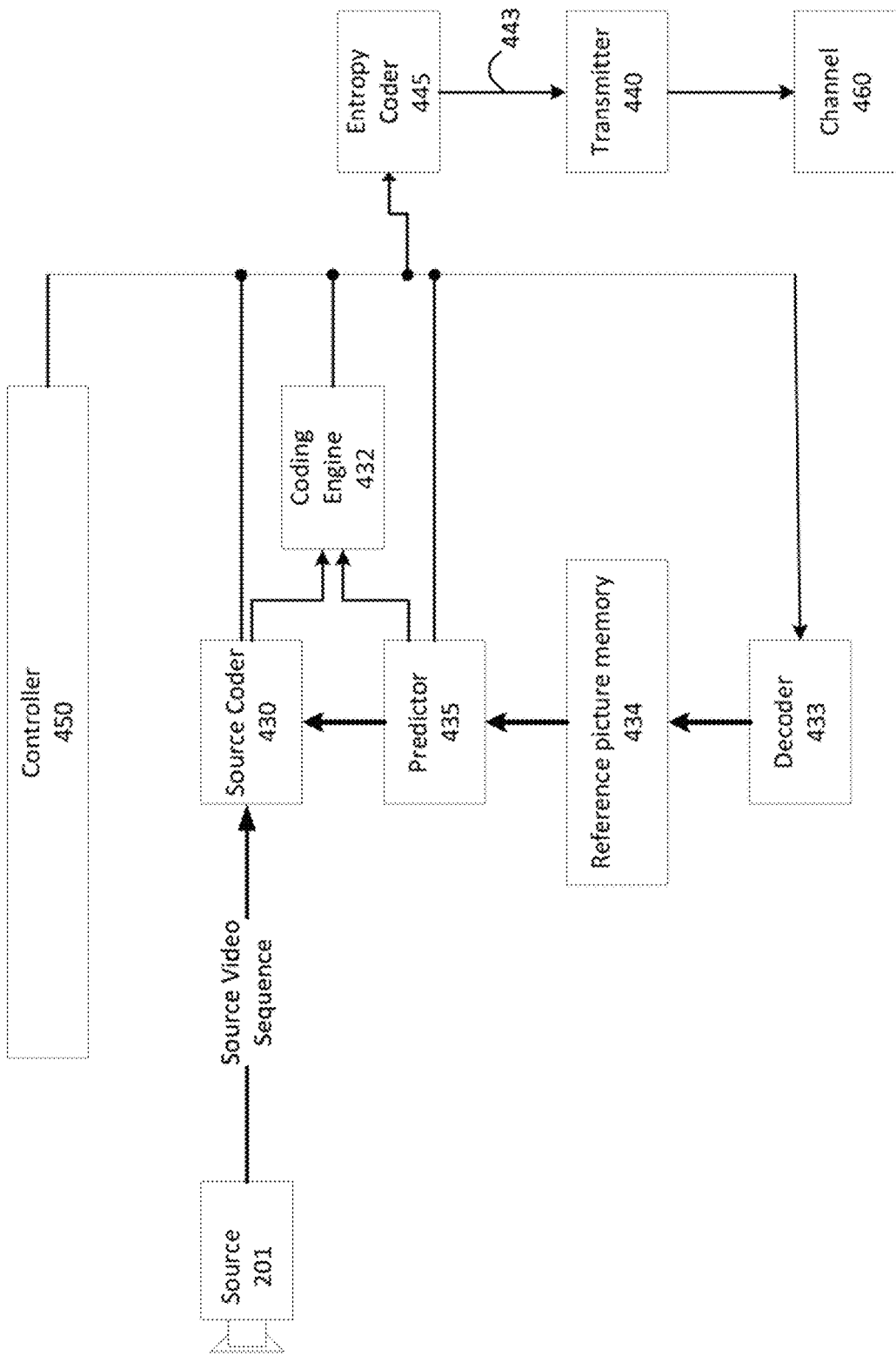
FIG. 4 is a schematic illustration of a simplified block diagram of an encoder in accordance with an embodiment.

FIG. 4 may be a functional block diagram of a video encoder (203) according to an embodiment of the present disclosure.

The encoder (203) may receive video samples from a video source (201) (that is not part of the encoder) that may capture video image(s) to be coded by the encoder (203).

The video source (201) may provide the source video sequence to be coded by the encoder (203) in the form of a digital video sample stream that can be of any suitable bit depth (for example: 8 bit, 10 bit, 12 bit, . . . ), any colorspace (for example, BT.601 Y CrCB, RGB, . . . ) and any suitable sampling structure (for example Y CrCb 4:2:0, Y CrCb 4:4:4). In a media serving system, the video source (201) may be a storage device storing previously prepared video. In a videoconferencing system, the video source (203) may be a camera that captures local image information as a video sequence. Video data may be provided as a plurality of individual pictures that impart motion when viewed in sequence. The pictures themselves may be organized as a spatial array of pixels, wherein each pixel can comprise one or more sample depending on the sampling structure, color space, etc. in use. A person skilled in the art can readily understand the relationship between pixels and samples. The description below focusses on samples.

According to an embodiment, the encoder (203) may code and compress the pictures of the source video sequence into a coded video sequence (443) in real time or under any other time constraints as required by the application. Enforcing appropriate coding speed is one function of Controller (450). Controller controls other functional units as described below and is functionally coupled to these units. The coupling is not depicted for clarity. Parameters set by controller can include rate control related parameters (picture skip, quantizer, lambda value of rate-distortion optimization techniques, . . . ), picture size, group of pictures (GOP) layout, maximum motion vector search range, and so forth. A person skilled in the art can readily identify other functions of controller (450) as they may pertain to video encoder (203) optimized for a certain system design.

Some video encoders operate in what a person skilled in the are readily recognizes as a "coding loop". As an oversimplified description, a coding loop can consist of the encoding part of an encoder (430) ("source coder" henceforth) (responsible for creating symbols based on an input picture to be coded, and a reference picture(s)), and a (local) decoder (433) embedded in the encoder (203) that reconstructs the symbols to create the sample data a (remote) decoder also would create (as any compression between symbols and coded video bitstream is lossless in the video compression technologies considered in the disclosed subject matter). That reconstructed sample stream is input to the reference picture memory (434). As the decoding of a symbol stream leads to bit-exact results independent of decoder location (local or remote), the reference picture buffer content is also bit exact between local encoder and remote encoder. In other words, the prediction part of an encoder "sees" as reference picture samples exactly the same sample values as a decoder would "see" when using prediction during decoding. This fundamental principle of reference picture synchronicity (and resulting drift, if synchronicity cannot be maintained, for example because of channel errors) is well known to a person skilled in the art.

The operation of the "local" decoder (433) can be the same as of a "remote" decoder (210), which has already been described in detail above in conjunction with FIG. 3. Briefly referring also to FIG. 4, however, as symbols are available and en/decoding of symbols to a coded video sequence by entropy coder (445) and parser (320) can be lossless, the entropy decoding parts of decoder (210), including channel (312), receiver (310), buffer (315), and parser (320) may not be fully implemented in local decoder (433).

An observation that can be made at this point is that any decoder technology except the parsing/entropy decoding that is present in a decoder also necessarily needs to be present, in substantially identical functional form, in a corresponding encoder. For this reason, the disclosed subject matter focusses on decoder operation. The description of encoder technologies can be abbreviated as they are the inverse of the comprehensively described decoder technologies. Only in certain areas a more detail description is required and provided below.

As part of its operation, the source coder (430) may perform motion compensated predictive coding, which codes an input frame predictively with reference to one or more previously-coded frames from the video sequence that were designated as "reference frames." In this manner, the coding engine (432) codes differences between pixel blocks of an input frame and pixel blocks of reference frame(s) that may be selected as prediction reference(s) to the input frame.

The local video decoder (433) may decode coded video data of frames that may be designated as reference frames, based on symbols created by the source coder (430). Operations of the coding engine (432) may advantageously be lossy processes. When the coded video data may be decoded at a video decoder (not shown in FIG. 4), the reconstructed video sequence typically may be a replica of the source video sequence with some errors. The local video decoder (433) replicates decoding processes that may be performed by the video decoder on reference frames and may cause reconstructed reference frames to be stored in the reference picture cache (434). In this manner, the encoder (203) may store copies of reconstructed reference frames locally that have common content as the reconstructed reference frames that will be obtained by a far-end video decoder (absent transmission errors).

The predictor (435) may perform prediction searches for the coding engine (432). That is, for a new frame to be coded, the predictor (435) may search the reference picture memory (434) for sample data (as candidate reference pixel blocks) or certain metadata such as reference picture motion vectors, block shapes, and so on, that may serve as an appropriate prediction reference for the new pictures. The predictor (435) may operate on a sample block-by-pixel block basis to find appropriate prediction references. In some cases, as determined by search results obtained by the predictor (435), an input picture may have prediction references drawn from multiple reference pictures stored in the reference picture memory (434).

The controller (450) may manage coding operations of the video coder (430), including, for example, setting of parameters and subgroup parameters used for encoding the video data.

Output of all aforementioned functional units may be subjected to entropy coding in the entropy coder (445). The entropy coder translates the symbols as generated by the various functional units into a coded video sequence, by loss-less compressing the symbols according to technologies known to a person skilled in the art as, for example Huffman coding, variable length coding, arithmetic coding, and so forth.

The transmitter (440) may buffer the coded video sequence(s) as created by the entropy coder (445) to prepare it for transmission via a communication channel (460), which may be a hardware/software link to a storage device which would store the encoded video data. The transmitter (440) may merge coded video data from the video coder (430) with other data to be transmitted, for example, coded audio data and/or ancillary data streams (sources not shown).

The controller (450) may manage operation of the encoder (203). During coding, the controller (450) may assign to each coded picture a certain coded picture type, which may affect the coding techniques that may be applied to the respective picture. For example, pictures often may be assigned as one of the following frame types:

An Intra Picture (I picture) may be one that may be coded and decoded without using any other frame in the sequence as a source of prediction. Some video codecs allow for different types of Intra pictures, including, for example Independent Decoder Refresh Pictures. A person skilled in the art is aware of those variants of I pictures and their respective applications and features.

A Predictive picture (P picture) may be one that may be coded and decoded using intra prediction or inter prediction using at most one motion vector and reference index to predict the sample values of each block.

A Bi-directionally Predictive Picture (B Picture) may be one that may be coded and decoded using intra prediction or inter prediction using at most two motion vectors and reference indices to predict the sample values of each block.

Similarly, multiple-predictive pictures can use more than two reference pictures and associated metadata for the reconstruction of a single block.

Source pictures commonly may be subdivided spatially into a plurality of sample blocks (for example, blocks of 4×4, 8×8, 4×8, or 16×16 samples each) and coded on a block-by-block basis. Blocks may be coded predictively with reference to other (already coded) blocks as determined by the coding assignment applied to the blocks' respective pictures. For example, blocks of I pictures may be coded non-predictively or they may be coded predictively with reference to already coded blocks of the same picture (spatial prediction or intra prediction). Pixel blocks of P pictures may be coded non-predictively, via spatial prediction or via temporal prediction with reference to one previously coded reference pictures. Blocks of B pictures may be coded non-predictively, via spatial prediction or via temporal prediction with reference to one or two previously coded reference pictures.

The video coder (203) may perform coding operations according to a predetermined video coding technology or standard, such as ITU-T Rec. H.265. In its operation, the video coder (203) may perform various compression operations, including predictive coding operations that exploit temporal and spatial redundancies in the input video sequence. The coded video data, therefore, may conform to a syntax specified by the video coding technology or standard being used.

In an embodiment, the transmitter (440) may transmit additional data with the encoded video. The video coder (430) may include such data as part of the coded video sequence. Additional data may comprise temporal/spatial/SNR enhancement layers, other forms of redundant data such as redundant pictures and slices, Supplementary Enhancement Information (SEI) messages, Visual Usability Information (VUI) parameter set fragments, and so on.

Recently, compressed domain aggregation or extraction of multiple semantically independent picture parts into a single video picture has gained some attention. In particular, in the context of, for example, 360 coding or certain surveillance applications, multiple semantically independent source pictures (for examples the six cube surface of a cube-projected 360 scene, or individual camera inputs in case of a multi-camera surveillance setup) may require separate adaptive resolution settings to cope with different per-scene activity at a given point in time. In other words, encoders, at a given point in time, may choose to use different resampling factors for different semantically independent pictures that make up the whole 360 or surveillance scene. When combined into a single picture, that, in turn, requires that reference picture resampling is performed, and adaptive resolution coding signaling is available, for parts of a coded picture.

Below, a few terms will be introduced that will be referred to in the remainder of this description.

Sub-Picture may refer to a, in some cases, rectangular arrangement of samples, blocks, macroblocks, coding units, or similar entities that are semantically grouped, and that may be independently coded in changed resolution. One or more sub-pictures may form a picture. One or more coded sub-pictures may form a coded picture. One or more sub-pictures may be assembled into a picture, and one or more sub pictures may be extracted from a picture. In certain environments, one or more coded sub-pictures may be assembled in the compressed domain without transcoding to the sample level into a coded picture, and in the same or other cases, one or more coded sub-pictures may be extracted from a coded picture in the compressed domain.

Reference Picture Resampling (RPR) or Adaptive Resolution Change (ARC) may refer to mechanisms that allow the change of resolution of a picture or sub-picture within a coded video sequence, by the means of, for example, reference picture resampling. RPR/ARC parameters henceforth refer to the control information required to perform adaptive resolution change, that may include, for example, filter parameters, scaling factors, resolutions of output and/or reference pictures, various control flags, and so forth.

In embodiments coding and decoding may be performed on a single, semantically independent coded video picture. Before describing the implication of coding/decoding of multiple sub pictures with independent RPR/ARC parameters and its implied additional complexity, options for signaling RPR/ARC parameters shall be described.

Figure 5:
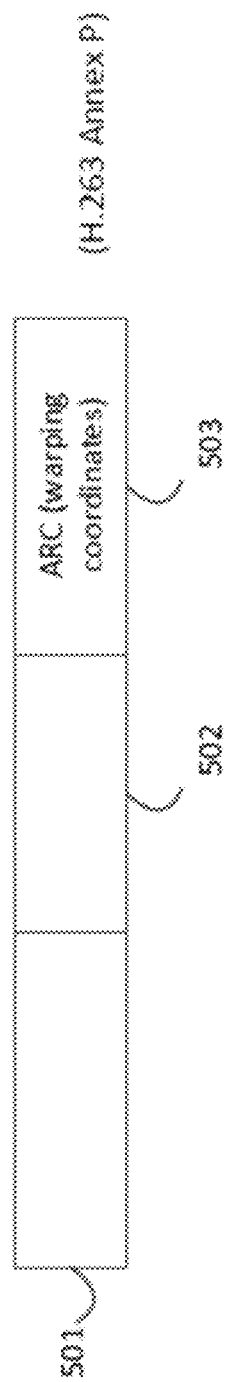
FIG. 5 is a schematic illustration of options for signaling ARC/RPR parameters in accordance with an embodiment.

Referring to FIG. 5, shown are several embodiments for signaling RPR/ARC parameters. As noted with each of the embodiments, they may have certain advantages and certain disadvantages from a coding efficiency, complexity, and architecture viewpoint. A video coding standard or technology may choose one or more of these embodiments, or options known from related art, for signaling RPR/ARC parameters. The embodiments may not be mutually exclusive, and conceivably may be interchanged based on application needs, standards technology involved, or encoder's choice.

Classes of RPR/ARC parameters may include:
up/downsample factors, separate or combined in X and Y dimension
up/downsample factors, with an addition of a temporal dimension, indicating constant speed zoom in/out for a given number of pictures
Either of the above two may involve the coding of one or more presumably short syntax elements that may point into a table containing the factor(s).
resolution, in X or Y dimension, in units of samples, blocks, macroblocks, coding units (CUs), or any other suitable granularity, of the input picture, output picture, reference picture, coded picture, combined or separately. If there is more than one resolution (such as, for example, one for input picture, one for reference picture) then, in certain cases, one set of values may be inferred to from another set of values. Such could be gated, for example, by the use of flags. For a more detailed example, see below.
"warping" coordinates akin those used in H.263 Annex P, again in a suitable granularity as described above. H.263 Annex P defines one efficient way to code such warping coordinates, but other, potentially more efficient ways could conceivably also be devised. For example, the variable length reversible, "Huffman"-style coding of warping coordinates of Annex P could be replaced by a suitable length binary coding, where the length of the binary code word could, for example, be derived from a maximum picture size, possibly multiplied by a certain factor and offset by a certain value, so to allow for "warping" outside of the maximum picture size's boundaries.
up or downsample filter parameters. In embodiments, there may be only a single filter for up and/or downsampling. However, in embodiments, it can be desirable to allow more flexibility in filter design, and that may require to signaling of filter parameters. Such parameters may be selected through an index in a list of possible filter designs, the filter may be fully specified (for example through a list of filter coefficients, using suitable entropy coding techniques), the filter may be implicitly selected through up/downsample ratios according which in turn are signaled according to any of the mechanisms mentioned above, and so forth.

Henceforth, the description assumes the coding of a finite set of up/downsample factors (the same factor to be used in both X and Y dimension), indicated through a codeword. That codeword may be variable length coded, for example using the Ext-Golomb code common for certain syntax elements in video coding specifications such as H.264 and H.265. One suitable mapping of values to up/downsample factors can, for example, be according to Table 1:

TABLE 1

| Codeword | Ext-Golomb Code | Original/Target resolution |
|---|---|---|
| 0 | 1 | 1/1 |
| 1 | 010 | 1/1.5 (upscale by 50%) |
| 2 | 011 | 1.5/1 (downscale by 50%) |
| 3 | 00100 | 1/2 (upscale by 100%) |
| 4 | 00101 | 2/1 (downscale by 100%) |

Many similar mappings could be devised according to the needs of an application and the capabilities of the up and downscale mechanisms available in a video compression technology or standard. The table could be extended to more values. Values may also be represented by entropy coding mechanisms other than Ext-Golomb codes, for example using binary coding. That may have certain advantages when the resampling factors were of interest outside the video processing engines (encoder and decoder foremost) themselves, for example by MANEs. It should be noted that, for situations where no resolution change is required, an Ext-Golomb code can be chosen that is short; in the table above, only a single bit. That can have a coding efficiency advantage over using binary codes for the most common case.

The number of entries in the table, as well as their semantics, may be fully or partially configurable. For example, the basic outline of the table may be conveyed in a "high" parameter set such as a sequence or decoder parameter set. In embodiments, one or more such tables may be defined in a video coding technology or standard, and may be selected through for example a decoder or sequence parameter set.

Below is described how an upsample/downsample factor (ARC information), coded as described above, may be included in a video coding technology or standard syntax. Similar considerations may apply to one, or a few, codewords controlling up/downsample filters. See below for a discussion when comparatively large amounts of data are required for a filter or other data structures.

As shown in FIG. 5, H.263 Annex P includes the ARC information (502) in the form of four warping coordinates into the picture header (501), specifically in the H.263 PLUSPTYPE (503) header extension. This can be a sensible design choice when a) there is a picture header available, and b) frequent changes of the ARC information are expected. However, the overhead when using H.263-style signaling can be quite high, and scaling factors may not pertain among picture boundaries as picture header can be of transient nature.

In the same or another embodiment, the signaling of ARC parameters can follow a detailed example as outlined in FIGS. 6A-6B. FIGS. 6A-6B depict syntax diagrams in a type of representation using a notation which roughly follows C-style programming, as for example used in video coding standards since at least 1993. Lines in boldface indicate syntax elements present in the bitstream, lines without boldface often indicate control flow or the setting of variables.

As shown in FIG. 6A, a tile group header (601) as an exemplary syntax structure of a header applicable to a (possibly rectangular) part of a picture can conditionally contain, a variable length, Exp-Golomb coded syntax element dec_pic_size_idx (602) (depicted in boldface). The presence of this syntax element in the tile group header can be gated on the use of adaptive resolution (603)—here, the value of a flag not depicted in boldface, which means that flag is present in the bitstream at the point where it occurs in the syntax diagram. Whether or not adaptive resolution is in use for this picture or parts thereof can be signaled in any high level syntax structure inside or outside the bitstream. In the example shown, it is signaled in the sequence parameter set as outlined below.

Referring to FIG. 6B, shown is also an excerpt of a sequence parameter set (610). The first syntax element shown is adaptive_pic_resolution_change_flag (611). When true, that flag can indicate the use of adaptive resolution which, in turn may require certain control information. In the example, such control information is conditionally present based on the value of the flag based on the if( ) statement in the parameter set (612) and the tile group header (601).

When adaptive resolution is in use, in this example, coded is an output resolution in units of samples (613). The numeral 613 refers to both output_pic_width_in_luma_samples and output_pic_height_in_luma_samples, which together can define the resolution of the output picture. Elsewhere in a video coding technology or standard, certain restrictions to either value can be defined. For example, a level definition may limit the number of total output samples, which could be the product of the value of those two syntax elements. Also, certain video coding technologies or standards, or external technologies or standards such as, for example, system standards, may limit the numbering range (for example, one or both dimensions must be divisible by a power of 2 number), or the aspect ratio (for example, the width and height must be in a relation such as 4:3 or 16:9). Such restrictions may be introduced to facilitate hardware implementations or for other reasons, and are well known in the art.

In certain applications, it can be advisable that the encoder instructs the decoder to use a certain reference picture size rather than implicitly assume that size to be the output picture size. In this example, the syntax element reference_pic_size_present_flag (614) gates the conditional presence of reference picture dimensions (615) (again, the numeral refers to both width and height).

Finally, shown is a table of possible decoding picture width and heights. Such a table can be expressed, for example, by a table indication (num_dec_pic_size_in_luma_samples_minus1) (616). The "minus1" can refer to the interpretation of the value of that syntax element. For example, if the coded value is zero, one table entry is present. If the value is five, six table entries are present. For each "line" in the table, decoded picture width and height are then included in the syntax (617).

The table entries presented (617) can be indexed using the syntax element dec_pic_size_idx (602) in the tile group header, thereby allowing different decoded sizes—in effect, zoom factors—per tile group.

Certain video coding technologies or standards, for example VP9, support spatial scalability by implementing certain forms of reference picture resampling (signaled quite differently from the disclosed subject matter) in conjunction with temporal scalability, so to enable spatial scalability. In particular, certain reference pictures may be upsampled using ARC-style technologies to a higher resolution to form the base of a spatial enhancement layer. Those upsampled pictures could be refined, using normal prediction mechanisms at the high resolution, so to add detail.

Embodiments discussed herein can be used in such an environment. In certain cases, in the same or another embodiment, a value in the NAL unit header, for example the Temporal ID field, can be used to indicate not only the temporal but also the spatial layer. Doing so may have certain advantages for certain system designs; for example, existing Selected Forwarding Units (SFU) created and optimized for temporal layer selected forwarding based on the NAL unit header Temporal ID value can be used without modification, for scalable environments. In order to enable that, there may be a requirement for a mapping between the coded picture size and the temporal layer is indicated by the temporal ID field in the NAL unit header.

Recently, compressed domain aggregation or extraction of multiple semantically independent picture parts into a single video picture has gained some attention. In particular, in the context of, for example, 360 coding or certain surveillance applications, multiple semantically independent source pictures (for examples the six cube surface of a cube-projected 360 scene, or individual camera inputs in case of a multi-camera surveillance setup) may require separate adaptive resolution settings to cope with different per-scene activity at a given point in time. In other words, encoders, at a given point in time, may choose to use different resampling factors for different semantically independent pictures that make up the whole 360 or surveillance scene. When combined into a single picture, that, in turn, requires that reference picture resampling is performed, and adaptive resolution coding signaling is available, for parts of a coded picture.

In embodiments, not all samples of a reconstructed picture are intended for output. An encoder can indicate a rectangular sub-part of picture as intended for output using a conformance window. The conformance window may be described or indicated through, for example, a left and right offset from the picture edges as defined by the picture size. Certain use cases can be identified where conformance windows may be relevant, including overscan, spatial assembly of views in Multiview systems, or 360 systems where a conformance windows may indicate one of several cube map surfaces to be output.

Because not all application require the use of a conformance window and because the conformance window parameters may require a certain amount of bits in the bitstream and hence, when not used, may harm coding efficiency, the presence of such parameters may be gated by a flag.

In embodiments, a conformance window size may be signaled in a picture parameter set (PPS). Conformance window parameters which may specify the conformance window size may be used for calculating the resampling ratio, when the conformance window size of the reference picture is different from that of the current picture. A decoder may need to recognize the conformance window size of each picture, to determine whether the resampling process is needed. When the resampling ratio is not equal to 1, the output picture size is not constant within a CVS, and special handling and post processing of output pictures like an up-/down-scaling for display may be used.

In embodiments, a flag that indicates whether the decoded/output picture has the same size and the resampling ratio is equal to 1 within a CVS/bitstream, may be signaled in a high-level parameter set such as a decoding parameter set (DPS), video parameter set (VPS), or sequence parameter set (SPS). The flag may be used for session negotiation for video streaming or configuration of decoder and display setting.

Referring to FIG. 7, a flag constant_pic_size_flag (704) equal to 1 may indicate that the picture sizes of the pictures in the CVS are the same. constant_pic_size_flag equal to 0 may indicate that the picture sizes of the pictures in the CVS may or may not be the same. If the value of constant_pic_size_flag is equal to 1, a flag sps_conformance_window_flag (705) may be present in SPS (701). sps_conformance_window_flag equal to 1 may indicate that the conformance cropping window offset parameters follow at a suitable location, for example, next, in the SPS. sps_conformance_window_flag equal to 0 may indicate that the conformance cropping window offset parameters are not present.

In embodiments, sps_conf_win_left_offset (706), sps_conf_win_right_offset (707), sps_conf_win_top_offset (708), and sps_conf_win_bottom_offset (709) may specify the samples of the pictures in the CVS that are output from the decoding process, in terms of a rectangular region specified in picture coordinates for output.

In embodiments, when the syntax elements sps_conf_win_left_offset, sps_conf_win_right_offset, sps_conf_win_top_offset, and sps_conf_win_bottom_offset are not present, the values of sps_conf_win_left_offset, sps_conf_win_right_offset, sps_conf_win_top_offset, and sps_conf_win_bottom_offset may be inferred to be equal to 0.

In embodiments, referring to FIG. 8, pic_width_in_luma_samples (802) may specify the width of each decoded picture referring to the PPS (801) in units of luma samples. In embodiments, pic_width_in_luma_samples may be not equal to 0, may be an integer multiple of Max(8, MinCbSizeY), and may be less than or equal to pic_width_max_in_luma_samples. When not present, the value of pic_width_in_luma_samples may be inferred to be equal to pic_width_max_in_luma_samples. pic_height_in_luma_samples (803) may specify the height of each decoded picture referring to the PPS in units of luma samples. pic_height_in_luma_samples may, in some cases, be not equal to 0 and may be an integer multiple of Max(8, MinCbSizeY), and may be less than or equal to pic_height_max_in_luma_samples. When not present, the value of pic_height_in_luma_samples may be inferred to be equal to pic_height_max_in_luma_samples.

In embodiments, still referring to FIG. 8, conformance_window_flag (804) equal to 1 may indicate that the conformance cropping window offset parameters follow at a suitable location, for example next in the PPS (801). conformance_window_flag equal to 0 may indicate that the conformance cropping window offset parameters are not present. conf_win_left_offset (805), conf_win_right_offset (806), conf_win_top_offset (807), and conf_win_bottom_offset (808) may specify the samples of the pictures referring to the PPS that are output from the decoding process, in terms of a rectangular region specified in picture coordinates for output.

In the same embodiment, when the syntax elements conf_win_left_offset, conf_win_right_offset, conf_win_top_offset, and conf_win_bottom_offset are not present, the values of conf_win_left_offset, conf_win_right_offset, conf_win_top_offset, and conf_win_bottom_offset may be inferred to be equal to the values of sps_conf_win_left_offset, sps_conf_win_right_offset, sps_conf_win_top_offset, and sps_conf_win_bottom_offset, respectively.

In embodiments, the conformance cropping window may contain the luma samples with horizontal picture coordinates from SubWidthC*conf_win_left_offset to pic_width_in_luma_samples−(SubWidthC*conf_win_right_offset+1) and vertical picture coordinates from SubHeightC*conf_win_top_offset to pic_height_in_luma_samples−(SubHeightC*conf_win_bottom_offset+1), inclusive.

The value of SubWidthC*(conf_win_left_offset+conf_win_right_offset) may be less than pic_width_in_luma_samples, and the value of SubHeightC*(conf_win_top_offset+conf_win_bottom_offset) may be less than pic_height_in_luma_samples.

The variables PicOutputWidthL and PicOutputHeightL may be derived as shown in Equation 1 and Equation 2 below:

PicOutputWidthL=pic_width_in_luma_samples−SubWidthC*(conf_win_right_offset+conf_win_left_offset)  (Equation 1)

PicOutputHeightL=pic_height_in_luma_samples−SubHeightC*(conf_win_bottom_offset+conf_win_top_offset)  (Equation 2)

In embodiments, the fractional interpolation process with the reference picture resampling may be processed as follows.

Inputs to this process may be a luma location (xSb, ySb) specifying the top-left sample of the current coding subblock relative to the top left luma sample of the current picture, a variable sbWidth specifying the width of the current coding subblock, a variable sbHeight specifying the height of the current coding subblock, a motion vector offset mvOffset, a refined motion vector refMvLX, the selected reference picture sample array refPicLX, the half sample interpolation filter index hpelIfIdx, the bi-directional optical flow flag bdofFlag, and a variable cIdx specifying the colour component index of the current block.

Outputs of this process may be: an (sbWidth+brdExtSize)×(sbHeight+brdExtSize) array predSamplesLX of prediction sample values.

The prediction block border extension size brdExtSize may be derived as shown in Equation 3 below:

brdExtSize=(bdofFlag||(inter_affine_flag[xSb][ySb] && sps_affine_prof_enabled_flag))?2:0  (Equation 3)

The variable fRefWidth may be set equal to the PicOutputWidthL of the reference picture in luma samples. The variable fRefHeight may be set equal to PicOutputHeightL of the reference picture in luma samples. The motion vector mvLX may be set equal to (refMvLX−mvOffset).

If cIdx is equal to 0, the following may apply:
The scaling factors and their fixed-point representations may be defined according to Equation 4 and Equation 5 below:

hori_scale_fp=((fRefWidth<<14)+(PicOutputWidthL>>1))/PicOutputWidthL  (Equation 4)

vert_scale_fp=((fRefHeight<<14)+(PicOutputHeightL>>1))/PicOutputHeightL  (Equation 5)

Let (xIntL, yIntL) may be a luma location given in full-sample units and (xFracL, yFracL) be an offset given in 1/16-sample units. These variables may be used in this clause for specifying fractional-sample locations inside the reference sample arrays refPicLX.

The top-left coordinate of the bounding block for reference sample padding ($xSbInt_L$, $ySbInt_L$) may be set equal to ($xSb+(mvLX[0]>>4)$, $ySb+(mvLX[1]>>4)$).

For each luma sample location ($x_L=0..sbWidth-1+brdExtSize$, $y_L=0..sbHeight-1+brdExtSize$) inside the prediction luma sample array predSamplesLX, the corresponding prediction luma sample value predSamplesLX[$x_L$][$y_L$] is derived as follows:

Let ($refxSb_L$, $refySb_L$) and ($refx_L$, $refy_L$) be luma locations pointed to by a motion vector (refMvLX, refMvLX) given in 1/16-sample units. The variables $refxSb_L$, $refx_L$, $refySb_L$, and $refy_L$ may be derived as shown in Equations 6-9 below:

$refxSb_L=((xSb<<4)+refMvLX[0])*hori\_scale\_fp$ (Equation 6)

$refx_L=((Sign(refxSb)*((Abs(refxSb)+128)>>>8)+x_L*((hori\_scale\_fp+8)>>4))+32)>>6$ (Equation 7)

$refySb_L=((ySb<<4)+refMvLX[1])*vert\_scale\_fp$ (Equation 8)

$refy_L=((Sign(refySb)*((Abs(refySb)+128)>>>8)+yL*((vert\_scale\_fp+8)>>4))+32)>>6$ (Equation 9)

The variables $xInt_L$, $yInt_L$, $xFrac_L$ and $yFrac_L$ may be derived as shown in Equations 10-13 below:

$xInt_L=refx_L>>4$ (Equation 10)

$yInt_L=refy_L>>4$ (Equation 11)

$xFrac_L=refx_L\&15$ (Equation 12)

$yFrac_L=refy_L\&15$ (Equation 13)

If bdofFlag is equal to TRUE or (sps_affine_prof_enabled_flag is equal to TRUE and inter_affine_flag[xSb][ySb] is equal to TRUE), and one or more of the following conditions are true, the prediction luma sample value predSamplesLX[$x_L$][$y_L$] may be derived by invoking the luma integer sample fetching process as specified in an appropriate clause of a video coding specification, with ($xInt_L+(xFrac_L>>3)-1$), $yInt_L+(yFrac_L>>>3)-1$) and refPicLX as inputs.
1. $x_L$ is equal to 0.
2. $x_L$ is equal to sbWidth+1.
3. $y_L$ is equal to 0.
4. $y_L$ is equal to sbHeight+1.

Otherwise, the prediction luma sample value predSamplesLX[xL][yL] may be derived by invoking the luma sample 8-tap interpolation filtering process as specified in an appropriate clause of a video coding specification with ($xIntL-(brdExtSize>0?1:0)$, $yIntL-(brdExtSize>0?1:0)$), (xFracL, yFracL), ($xSbInt_L$, $ySbInt_L$), refPicLX, hpelIfIdx, sbWidth, sbHeight and (xSb, ySb) as inputs.

Otherwise (cIdx is not equal to 0), the following may apply:
1. Let (xIntC, yIntC) be a chroma location given in full-sample units and (xFracC, yFracC) be an offset given in 1/32 sample units. These variables may be used in this clause for specifying general fractional-sample locations inside the reference sample arrays refPicLX.
2. The top-left coordinate of the bounding block for reference sample padding (xSbIntC, ySbIntC) is set equal to ((xSb/SubWidthC)+(mvLX[0]>>5), (ySb/SubHeightC)+(mvLX[1]>>5)).
3. For each chroma sample location (xC=0..sbWidth-1, yC=0..sbHeight-1) inside the prediction chroma sample arrays predSamplesLX, the corresponding prediction chroma sample value predSamplesLX[xC][yC] may be derived as follows:

Let ($refxSb_C$, $refySb_C$) and ($refx_C$, $refy_C$) be chroma locations pointed to by a motion vector (mvLX[0], mvLX[1]) given in 1/32-sample units. The variables $refxSb_C$, $refySb_C$, $refx_C$ and $refy_C$ may be derived as shown in Equations 14-17 below:

$refxSb_C=((xSb/SubWidthC<<5)+mvLX[0])*hori\_scale\_fp$ (Equation 14)

$refx_C=((Sign(refxSb_C)*((Abs(refxSb_C)+256)>>>9)+xC*((hori\_scale\_fp+8)>>>4))+16)>>5$ (Equation 15)

$refySb_C=((ySb/SubHeightC<<5)+mvLX[1])*vert\_scale\_fp$ (Equation 16)

$refy_C=((Sign(refySb_C)*((Abs(refySb_C)+256)>>>9)+yC*((vert\_scale\_fp+8)>>>4))+16)>>>5$ (Equation 17)

The variables $xInt_C$, $yInt_C$, $xFrac_C$ and $yFrac_C$ may be derived as shown in Equations 18-21 below:

$xInt_C=refx_C>>5$ (Equation 18)

$yInt_C=refy_C>>>5$ (Equation 19)

$xFrac_C=refy_C\&31$ (Equation 20)

$yFrac_C=refy_C\&31$ (Equation 21)

The prediction sample value predSamplesLX[xC][yC] may be derived by invoking the process specified above with (xIntC, yIntC), (xFracC, yFracC), (xSbIntC, ySbIntC), sbWidth, sbHeight and refPicLX as inputs.

Figure 9:
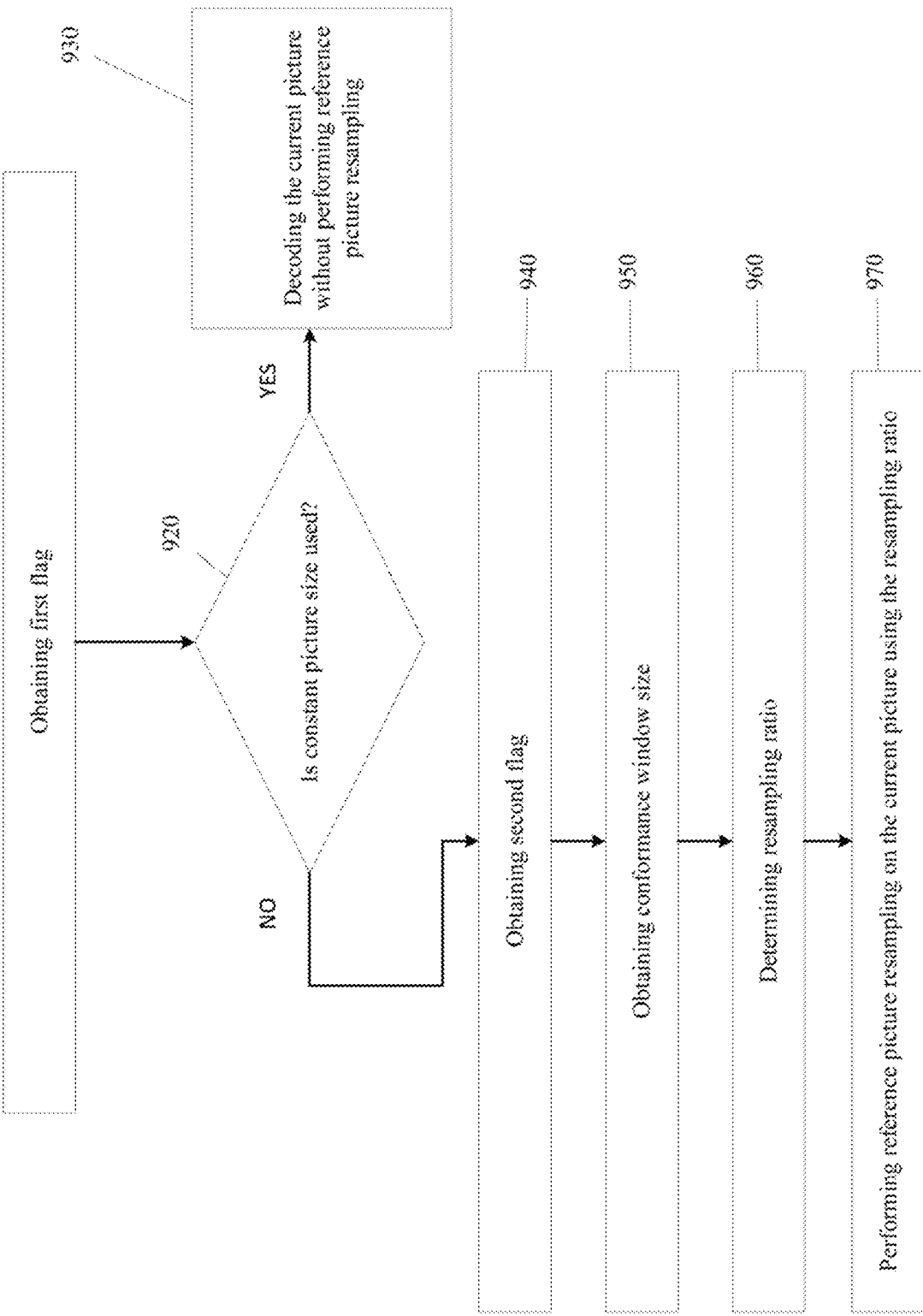
FIG. 9 is a flowchart of an example process for decoding an encoded video bitstream in accordance with an embodiment.

FIG. 9 is a flowchart is an example process 900 for decoding an encoded video bitstream. In some implementations, one or more process blocks of FIG. 9 may be performed by decoder 210. In some implementations, one or more process blocks of FIG. 9 may be performed by another device or a group of devices separate from or including decoder 210, such as encoder 203.

As shown in FIG. 9, process 900 may include obtaining a first flag indicating whether a constant picture size is used in a coded video sequence including a current picture (block 910).

As further shown in FIG. 9, process 900 may include, determining from the first flag whether the constant picture size is used (block 920).

As further shown in FIG. 9, process 900 may include, based on the first flag indicating that the constant picture size is used (YES at block 920), decoding the current picture without performing reference picture resampling (block 930).

As further shown in FIG. 9, based on the first flag indicating that the constant picture size is not used (NO at block 920), process 900 may proceed to block 940, block 950, block 960, and block 970.

As further shown in FIG. 9, process 900 may include obtaining a second flag indicating whether a conformance window size is signaled (block 940).

As further shown in FIG. 9, process 900 may include, based on the second flag indicating that the conformance window size is signaled, obtaining the conformance window size (block 950), determining a resampling ratio between the current picture and a reference picture based on the conformance window size (block 960), and performing the reference picture resampling on the current picture using the resampling ratio (block 970).

In an embodiment, the conformance window size may be signaled as at least one offset distance from a border of the current picture.

In an embodiment, the first flag may be signaled in a sequence parameter set (SPS), and the second flag may be signaled in one from among the SPS and a picture parameter set (PPS).

In an embodiment, the second flag may be signaled in the SPS, and may indicate whether SPS conformance window parameters are signaled in the SPS.

In an embodiment, based on the second flag indicating that the SPS conformance window parameters are signaled in the SPS, the conformance window size may be obtained based on the SPS conformance window parameters.

In an embodiment, based on the first flag indicating that the picture size is not constant, process 900 may include obtaining a third flag indicating whether PPS conformance window parameters are signaled in the PPS.

In an embodiment, based on the second flag indicating that the SPS conformance window parameters are signaled in the SPS, and the third flag indicating that the PPS conformance window parameters are not signaled in the PPS, the conformance window size may be obtained based on the SPS conformance window parameters.

In an embodiment, based on the second flag indicating that the SPS conformance window parameters are not signaled in the SPS, and the third flag indicating that the PPS conformance window parameters are signaled in the PPS, the conformance window size may be obtained based on the PPS conformance window parameters.

Although FIG. 9 shows example blocks of process 900, in some implementations, process 900 may include additional blocks, fewer blocks, different blocks, or differently arranged blocks than those depicted in FIG. 9. Additionally, or alternatively, two or more of the blocks of process 900 may be performed in parallel.

Further, the proposed methods may be implemented by processing circuitry (e.g., one or more processors or one or more integrated circuits). In one example, the one or more processors execute a program that is stored in a non-transitory computer-readable medium to perform one or more of the proposed methods.

The techniques described above can be implemented as computer software using computer-readable instructions and physically stored in one or more computer-readable media. For example, FIG. 10 shows a computer system 1000 suitable for implementing certain embodiments of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

The components shown in FIG. 10 for computer system 1000 are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system 1000.

Computer system 1000 may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard 1001, mouse 1002, trackpad 1003, touch screen 1010 and associated graphics adapter 1050, data-glove, joystick 1005, microphone 1006, scanner 1007, camera 1008.

Computer system 1000 may also include certain human interface output devices. Such human interface output devices may be stimulating the senses of one or more human users through, for example, tactile output, sound, light, and smell/taste. Such human interface output devices may include tactile output devices (for example tactile feedback by the touch-screen 1010, data-glove, or joystick 1005, but there can also be tactile feedback devices that do not serve as input devices), audio output devices (such as: speakers 1009, headphones (not depicted)), visual output devices (such as screens 1010 to include cathode ray tube (CRT) screens, liquid-crystal display (LCD) screens, plasma screens, organic light-emitting diode (OLED) screens, each with or without touch-screen input capability, each with or without tactile feedback capability—some of which may be capable to output two dimensional visual output or more than three dimensional output through means such as stereographic output; virtual-reality glasses (not depicted), holographic displays and smoke tanks (not depicted)), and printers (not depicted).

Computer system 1000 can also include human accessible storage devices and their associated media such as optical media including CD/DVD ROM/RW 1020 with CD/DVD or the like media 1021, thumb-drive 1022, removable hard drive or solid state drive 1023, legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system 1000 can also include interface(s) to one or more communication networks (1155). Networks can for example be wireless, wireline, optical. Networks can further be local, wide-area, metropolitan, vehicular and industrial, real-time, delay-tolerant, and so on. Examples of networks include local area networks such as Ethernet, wireless LANs, cellular networks to include global systems for mobile communications (GSM), third generation (3G), fourth generation (4G), fifth generation (5G), Long-Term Evolution (LTE), and the like, TV wireline or wireless wide area digital networks to include cable TV, satellite TV, and terrestrial broadcast TV, vehicular and industrial to include CANBus, and so forth. Certain networks commonly require external network interface adapters (1154) that attached to certain general purpose data ports or peripheral buses (1149) (such as, for example universal serial bus (USB) ports of the computer system 1000; others are commonly integrated into the core of the computer system 1000 by attachment to a system bus as described below (for example Ethernet interface into a PC computer system or cellular network interface into a smartphone computer system). As an example, network 1055 may be connected to peripheral bus 1049 using network interface 1054. Using any of these networks, computer system 1000 can communicate with other entities. Such communication can be uni-directional, receive only (for example, broadcast TV), uni-directional send-only (for example CANbus to certain CANbus devices), or bi-directional, for example to other computer systems using local or wide area digital networks. Certain protocols and protocol stacks can be used on each of those networks and network interfaces (1154) as described above.

Aforementioned human interface devices, human-accessible storage devices, and network interfaces can be attached to a core 1040 of the computer system 1000.

The core 1040 can include one or more Central Processing Units (CPU) 1041, Graphics Processing Units (GPU) 1042, specialized programmable processing units in the form of Field Programmable Gate Areas (FPGA) 1043, hardware accelerators 1044 for certain tasks, and so forth. These devices, along with Read-only memory (ROM) 1045, Random-access memory (RAM) 1046, internal mass storage such as internal non-user accessible hard drives, solid-state drives (SSDs), and the like 1047, may be connected through a system bus 1048. In some computer systems, the system bus 1048 can be accessible in the form of one or more physical plugs to enable extensions by additional CPUs, GPU, and the like. The peripheral devices can be attached either directly to the core's system bus 1048, or through a peripheral bus 1049. Architectures for a peripheral bus include peripheral component interconnect (PCI), USB, and the like.

CPUs 1041, GPUs 1042, FPGAs 1043, and accelerators 1044 can execute certain instructions that, in combination, can make up the aforementioned computer code. That computer code can be stored in ROM 1045 or RAM 1046. Transitional data can be also be stored in RAM 1046, whereas permanent data can be stored for example, in the internal mass storage 1047. Fast storage and retrieve to any of the memory devices can be enabled through the use of cache memory, that can be closely associated with one or more CPU 1041, GPU 1042, mass storage 1047, ROM 1045, RAM 1046, and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture 1000, and specifically the core 1040 can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core 1040 that are of non-transitory nature, such as core-internal mass storage 1047 or ROM 1045. The software implementing various embodiments of the present disclosure can be stored in such devices and executed by core 1040. A computer-readable medium can include one or more memory devices or chips, according to particular needs. The software can cause the core 1040 and specifically the processors therein (including CPU, GPU, FPGA, and the like) to execute particular processes or particular parts of particular processes described herein, including defining data structures stored in RAM 1046 and modifying such data structures according to the processes defined by the software. In addition or as an alternative, the computer system can provide functionality as a result of logic hardwired or otherwise embodied in a circuit (for example: accelerator 1044), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

What is claimed is:

1. A method of encoding a video bitstream using at least one processor, the method comprising:
    determining a first flag indicating whether a constant picture size is used in a video sequence including a current picture;
    based on the first flag indicating that the constant picture size is used, encoding the current picture without performing reference picture resampling;
    based on the first flag indicating that the constant picture size is not used, determining a second flag indicating whether a conformance window size is to be signaled;
    based on the second flag indicating that the conformance window size is signaled:
        determining the conformance window size,
        determining a resampling ratio between the current picture and a reference picture based on the conformance window size, and
    performing the reference picture resampling on the current picture using the resampling ratio.

2. The method of claim 1, wherein the conformance window size is signaled as at least one offset distance from a border of the current picture.

3. The method of claim 1, wherein the first flag is signaled in a sequence parameter set (SPS), and
    wherein the second flag is signaled in one from among the SPS and a picture parameter set (PPS).

4. The method of claim 1, wherein the second flag is signaled in the SPS, and indicates whether SPS conformance window parameters are signaled in the SPS.

5. The method of claim 4, further comprising, based on the first flag indicating that a picture size is not constant, determining a third flag indicating whether PPS conformance window parameters are signaled in the PPS.

6. The method of claim 5, wherein based on the second flag indicating that the SPS conformance window parameters are signaled in the SPS, and the third flag indicating that the PPS conformance window parameters are not signaled in the PPS, the conformance window size is determined based on the SPS conformance window parameters.

7. The method of claim 5, wherein based on the second flag indicating that the SPS conformance window parameters are not signaled in the SPS, and the third flag indicating that the PPS conformance window parameters are signaled in the PPS, the conformance window size is determined based on the PPS conformance window parameters.

8. A method of decoding a video bitstream using at least one processor, the method comprising:
determining a first flag indicating whether a constant picture size is used in a coded video sequence including a current picture;
based on the first flag indicating that the constant picture size is used, decoding the current picture without performing reference picture resampling;
based on the first flag indicating that the constant picture size is not used, determining a second flag indicating whether a conformance window size is signaled;
based on the second flag indicating that the conformance window size is signaled:
determining the conformance window size,
determining a resampling ratio between the current picture and a reference picture based on the conformance window size, and
performing the reference picture resampling on the current picture using the resampling ratio.

9. The method of claim 8, wherein the conformance window size is signaled as at least one offset distance from a border of the current picture.

10. The method of claim 8, wherein the first flag is signaled in a sequence parameter set (SPS), and
wherein the second flag is signaled in one from among the SPS and a picture parameter set (PPS).

11. The method of claim 8, wherein the second flag is signaled in the SPS, and indicates whether SPS conformance window parameters are signaled in the SPS.

12. The method of claim 11, further comprising, based on the first flag indicating that a picture size is not constant, determining a third flag indicating whether PPS conformance window parameters are signaled in the PPS.

13. The method of claim 12, wherein based on the second flag indicating that the SPS conformance window parameters are signaled in the SPS, and the third flag indicating that the PPS conformance window parameters are not signaled in the PPS, the conformance window size is determined based on the SPS conformance window parameters.

14. The method of claim 12, wherein based on the second flag indicating that the SPS conformance window parameters are not signaled in the SPS, and the third flag indicating that the PPS conformance window parameters are signaled in the PPS, the conformance window size is determined based on the PPS conformance window parameters.

15. A method of video processing using at least one processor, the method comprising:
performing a conversion between a visual media file and a bitstream of a visual media data according to a format rule, the format rule indicating that the bitstream comprises a plurality of syntax elements and to implement:
determining a first flag indicating whether a constant picture size is used in a video sequence including a current picture;
based on the first flag indicating that the constant picture size is used, processing the current picture without performing reference picture resampling;
based on the first flag indicating that the constant picture size is not used, determining a second flag indicating whether a conformance window size is to be signaled;
based on the second flag indicating that the conformance window size is included in the bitstream:
determining the conformance window size,
determining a resampling ratio between the current picture and a reference picture based on the conformance window size, and
performing the reference picture resampling on the current picture using the resampling ratio.

16. The method of claim 15, wherein the conformance window size is signaled as at least one offset distance from a border of the current picture.

17. The method of claim 15, wherein the first flag is signaled in a sequence parameter set (SPS), and
wherein the second flag is signaled in one from among the SPS and a picture parameter set (PPS).

18. The method of claim 15, wherein the second flag is signaled in the SPS, and indicates whether SPS conformance window parameters are signaled in the SPS.

19. The method of claim 18, further comprising, based on the first flag indicating that a picture size is not constant, determining a third flag indicating whether PPS conformance window parameters are signaled in the PPS.

20. The method of claim 19, wherein based on the second flag indicating that the SPS conformance window parameters are signaled in the SPS, and the third flag indicating that the PPS conformance window parameters are not signaled in the PPS, the conformance window size is determined based on the SPS conformance window parameters.

* * * * *